United States Patent
Takeda et al.

(10) Patent No.: US 10,760,524 B2
(45) Date of Patent: Sep. 1, 2020

(54) INTERNAL COMBUSTION ENGINE

(71) Applicant: HONDA MOTOR CO., LTD., Minato-ku, Tokyo (JP)

(72) Inventors: Naoaki Takeda, Wako (JP); Naokazu Kawase, Wako (JP); Yoshihiro Okada, Wako (JP); Shinya Abe, Wako (JP); Hidehumi Kuramitsu, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/344,704

(22) PCT Filed: Nov. 18, 2016

(86) PCT No.: PCT/JP2016/004921
§ 371 (c)(1),
(2) Date: Apr. 24, 2019

(87) PCT Pub. No.: WO2018/092176
PCT Pub. Date: May 24, 2018

(65) Prior Publication Data
US 2019/0338723 A1    Nov. 7, 2019

(51) Int. Cl.
*F02F 3/00*    (2006.01)
*F16J 1/04*    (2006.01)
*F02F 1/18*    (2006.01)

(52) U.S. Cl.
CPC ............ *F02F 1/183* (2013.01); *F02F 3/0069* (2013.01)

(58) Field of Classification Search
CPC ........ F16J 1/04; F16J 1/08; F16J 10/04; F02F 3/00; F02F 3/022
See application file for complete search history.

(56) References Cited

U.S. PATENT DOCUMENTS 4,158,328 A * 6/1979 Beardmore ............... F16J 1/04
                                                  123/193.4
5,261,321 A   11/1993 Whitacre
(Continued)

FOREIGN PATENT DOCUMENTS

DE    102013013943 B3    1/2015
JP    S5613526 U         2/1981
(Continued)

OTHER PUBLICATIONS

English translation of International Search Report for International Application No. PCT/JP2016/004921, dated Jan. 17, 2017, 2 pages.

*Primary Examiner* — Long T Tran
(74) *Attorney, Agent, or Firm* — Armstrong Teasdale LLP

(57) ABSTRACT

An internal combustion engine includes an engine main body defining a cylinder bore, a piston received in the cylinder bore, and a crankshaft rotatably supported by the engine main body and connected with the piston via a connecting rod, the piston including a skirt. The cylinder bore includes a first region defined as a range along the cylinder axial line on a side of a top dead center from a first piston position, and a second region defined as a range along the cylinder axial line on a side of the bottom dead center from a second piston position closer to the bottom dead center than the first piston position, and a connection region positioned between the first and second regions. A diameter of the cylinder bore is smaller in the first region than in the second region, and the connection region connects the first and second regions smoothly.

6 Claims, 10 Drawing Sheets

(56) References Cited

U.S. PATENT DOCUMENTS

| | | | | |
|---|---|---|---|---|
| 6,345,569 B1* | 2/2002 | Take | ................. | F02F 3/022 |
| | | | | 92/208 |
| 6,357,341 B1* | 3/2002 | Watanabe | ................. | F02F 3/00 |
| | | | | 123/193.6 |
| 9,086,147 B2* | 7/2015 | Pegg | ................. | F16J 1/09 |
| 2018/0051649 A1* | 2/2018 | Loew | ................. | F02F 3/0076 |

FOREIGN PATENT DOCUMENTS

| | | | |
|---|---|---|---|
| JP | S57126539 | A | 8/1982 |
| JP | S6060240 | A | 4/1985 |
| JP | S6117154 | U | 1/1986 |
| JP | H06185405 | A | 7/1994 |
| JP | 2000282951 | A | 10/2000 |
| JP | 2002221084 | A | 8/2002 |
| WO | 2013064228 | A1 | 5/2013 |

\* cited by examiner

INTERNAL COMBUSTION ENGINE

CROSS-REFERENCE TO RELATED APPLICATIONS

This application is a U.S. National Phase Application of PCT/JP2016/004921, filed Nov. 18, 2016, the contents of which are hereby expressly incorporated by reference in their entirety.

TECHNICAL FIELD

The present invention relates to an internal combustion engine, and more particularly to a reciprocating internal combustion engine.

BACKGROUND ART

In a reciprocating internal combustion engine, in order to improve fuel economy by reducing the friction between the piston and the wall surface of the cylinder bore, it is desirable to increase the clearance between the piston and the wall surface of the cylinder bore (in other words, increase the piston clearance). However, when the clearance between the piston and the wall surface of the cylinder bore is increased, piston slap noise increases. Piston slap noise is caused by the collision of the skirt of the piston with the wall surface of the cylinder bore as a result of the swinging movement of the piston. Therefore, it is difficult to reduce friction and suppress piston slap noise at the same time.

In order to achieve these contradicting goals, Patent Document 1 proposes an improvement in the shape of the skirt of the piston. According to the piston disclosed in Patent Document 1, the skirt is provided with a barrel shape in such a manner that the radial projection of the skirt is maximized at a vertical position that is closer to the lower edge of the skirt than the center of the pin boss. However, the reduction of friction and the reduction of piston slap noise can be achieved only to a limited extent simply by adjusting the shape of the skirt of the piston.

Patent Document 2 proposes the use of a cylinder liner that defines a sliding surface of a cylinder bore which is configured such that the inner diameter of the part of the cylinder liner corresponding to the top ring at the top dead center of the piston is smaller than the inner diameter of the remaining part of the cylinder liner, and the inner diameter of the cylinder liner gets progressively greater as one moves from this point to the lower end thereof. According to this arrangement, oil is deposited in the top ring groove by using a suitable arrangement. As the piston moves toward the top dead center in the cylinder bore, the piston ring is pushed by the sliding surface of the cylinder bore into the ring groove. As a result, the oil deposited in the top ring can be pushed out into the gap between the sliding surface of the cylinder bore (sliding surface of the cylinder liner) and the piston to lubricate the sliding movement between the cylinder liner and the piston. Thus, the direct contact between the piston and the cylinder bore can be avoided so that the wear of the part of the sliding surface of the cylinder bore corresponding to the top ring at the top dead center of the piston can be avoided. However, piston slap noise caused by the collision between the skirt of the piston and the wall surface of the cylinder bore cannot be suppressed.

PRIOR ART DOCUMENT(S)

Patent Document(s)

Patent Document 1: JP2002-221084A
Patent Document 2: JPS60-60240A

SUMMARY OF THE INVENTION

Task to be Accomplished by the Invention

In view of such a problem of the prior art, a primary object of the present invention is to provide an internal combustion engine that can suppress piston slap noise and reduce friction at the same time.

Means for Accomplishing the Task

To achieve such an object, the present invention provides an internal combustion engine (1), comprising: an engine main body (2) defining a cylinder bore (3, 53); a piston (4) received in the cylinder bore to reciprocate along a cylinder axial line (X); and a crankshaft (8) rotatably supported by the engine main body and connected with the piston via a connecting rod (6), wherein the piston includes a skirt consisting of a pair of skirt parts (22), wherein the cylinder bore includes: a first region (A1) defined as a range along the cylinder axial line in which a maximum diameter portion of the skirt is positioned when the piston is on a side of a top dead center from a first piston position (P1) that is displaced from the top dead center toward a bottom dead center by a prescribed distance; a second region (A2) defined as a range along the cylinder axial line in which the maximum diameter portion of the skirt is positioned when the piston is on a side of the bottom dead center from a second piston position (P2) that is closer to the bottom dead center than the first piston position; and a connection region (A3) positioned between the first and second regions, and wherein a diameter of the cylinder bore in a direction perpendicular to an axial line of the crankshaft is smaller in the first region than in the second region, and the connection region connects the first region and the second region smoothly.

The inventors of the present invention have discovered that the skirt of the piston collides with the wall surface of the cylinder bore, and piston slap noise is thereby generated primarily when the piston is located within a certain range relatively close to the top dead center, and that piston slap noise is practically never generated even when the diameter of the cylinder bore is comparatively large as long as the piston is below this range on the side of the bottom dead center. According to the above configuration, by defining the first region of the cylinder bore along the cylinder axial line so as to include at least a part of the range where the maximum diameter portion is located when the piston is in the prescribed range (by setting the first piston position on the side of the bottom dead center from the lower edge of the prescribed range, for instance), and reducing the diameter of the cylinder bore (or reducing the clearance between the wall surface of the cylinder bore and the skirt) at least in a part of the prescribed range, piston slap noise can be suppressed. Also, according to the above configuration, since the second region of the cylinder bore includes at least a part of the range along the cylinder axial line where the maximum diameter portion of the skirt is located when the piston is on the side of the bottom dead center from the prescribed range, and the diameter of the cylinder bore is increased (or the clearance between the wall surface of the cylinder bore and the skirt is increased) at least in a part of the prescribed range, friction between the piston and the wall surface of the cylinder bore can be reduced without increasing piston slap noise. Thus, the above configuration realizes an internal combustion engine that can suppress piston slap noise and reduce friction at the same time.

In this arrangement, the skirt is preferably provided with a radially bulging part so as have a barrel shape, and the maximum diameter portion is defined as the radially most bulging part of the skirt.

In this arrangement, preferably, the first piston position is set to be closer to the bottom dead center than a position of the piston corresponding to a crank angle of thirty degrees from the top dead center.

Piston slap noise is known to be most prominent when the piston is positioned somewhat on the side of the top dead center from the position corresponding to the crank angle of thirty degrees from the top dead center. According to this arrangement, the clearance between the skirt and the wall surface of the cylinder bore is reduced when the piston is positioned in the range corresponding to this crankshaft angle range where piston slap noise can otherwise increase so that piston slap noise can be effectively suppressed.

In this arrangement, preferably, the second piston position is set to be closer to the bottom dead center than a position of the piston corresponding to a crank angle of fifty five degrees from the top dead center.

Prominent piston slap noise can be generated when the crank angle is in the range of fifty five degrees from the top dead center. According to this arrangement, the clearance between the skirt and the wall surface of the cylinder bore is reduced when the piston is positioned in the range corresponding to this crankshaft angle range where piston slap noise can otherwise increase so that piston slap noise can be effectively suppressed.

In this arrangement, preferably, the first piston position is set to be closer to the top dead center than a position of the piston corresponding to a crank angle of 120 degrees from the top dead center.

Piston slap noise may be generated to some extent when the crank angle is in the range from the top dead center to a point about 120 degrees away therefrom, but is almost never generated on the side of the bottom dead center from this point. Therefore, when the first piston position is set to the side of the bottom dead center from the crank angle of 120 degrees from the top dead center, little improvement in the reduction of piston slap noise can be expected, and the friction between the wall surface of the cylinder bore and the piston is adversely affected owing to the decrease in the size of the second region which is located to the side of the bottom dead center from the first region and where the diameter of the cylinder bore is comparatively increased. According to this arrangement, the light piston slap noise can be suppressed, and an adequate length of the second region of the cylinder bore along the cylinder axial line can be ensured so that the friction between the wall surface of the cylinder bore and the piston can be minimized.

In this arrangement, preferably, the second piston position is set to be closer to the top dead center than a point where the crank angle is 120 degrees from the top dead center.

According to this arrangement, it can be ensured that the second region, in which the diameter of the cylinder bore is relatively large, has an adequate length along the cylinder axial line so that the friction between the wall surface of the cylinder bore and the piston can be minimized.

In this arrangement, preferably, a cross sectional shape of the cylinder bore in a plane perpendicular to the cylinder axial line is substantially uniform in the first region defined along the cylinder axial line, and a cross sectional shape of the cylinder bore in the plane perpendicular to the cylinder axial line is substantially uniform in the second region defined along the cylinder axial line.

Thereby, the configuration of the cylinder bore is simplified so that the cylinder bore can be formed with ease.

In this arrangement, preferably, a cross sectional shape of the cylinder bore in a plane perpendicular to the cylinder axial line is circular in all of the first region, the connection region and the second region.

Thereby, the cylinder bore can be formed with ease. In particular, the cylinder bore can be favorably finished by honing without any difficulty.

Preferably, the piston is provided with a piston ring having an end gap, wherein a cross sectional shape of the cylinder bore in the plane perpendicular to the cylinder axial line is an ellipse in the first region, the ellipse having a minor axis extending in a direction perpendicular to the axial line of the crankshaft and a major axis extending along the axial line of the crankshaft, and a cross sectional shape of the cylinder bore in the plane perpendicular to the cylinder axial line is an ellipse in the second region, the ellipse having a major axis extending in a direction perpendicular to the axial line of the crankshaft and a minor axis extending along the axial line of the crankshaft, the cylinder bore having a substantially same circumferential length in all of the first region, the second region, and the connection region.

The piston ring fitted on the piston receives a force that tends to expand the piston ring under the tension thereof so that the outer circumferential surface of the piston ring is always in contact with the wall surface of the cylinder bore. Therefore, as the piston moves between the top dead center and the bottom dead center, the piston ring is deformed so as to conform to the cross sectional shape of the cylinder bore. According to this arrangement, because the circumferential length of the cross sectional shape of the cylinder bore in the plane perpendicular to the cylinder axial line remains constant as the piston moves between the top dead center and the bottom dead center, the end gap between the circumferential ends of the piston ring is kept constant as the piston moves between the top dead center and the bottom dead center. Therefore, even though the cross sectional shape of the cylinder bore in the plane perpendicular to the cylinder axial line changes between the first region and the second region, the amount of blowby gas that passes out of the combustion chamber via the end gap is prevented from increasing.

Effect of the Invention

The present invention thus provides an internal combustion engine that can suppress piston slap noise and reduce friction at the same time.

BRIEF DESCRIPTION OF THE DRAWING(S)

Figure 5:
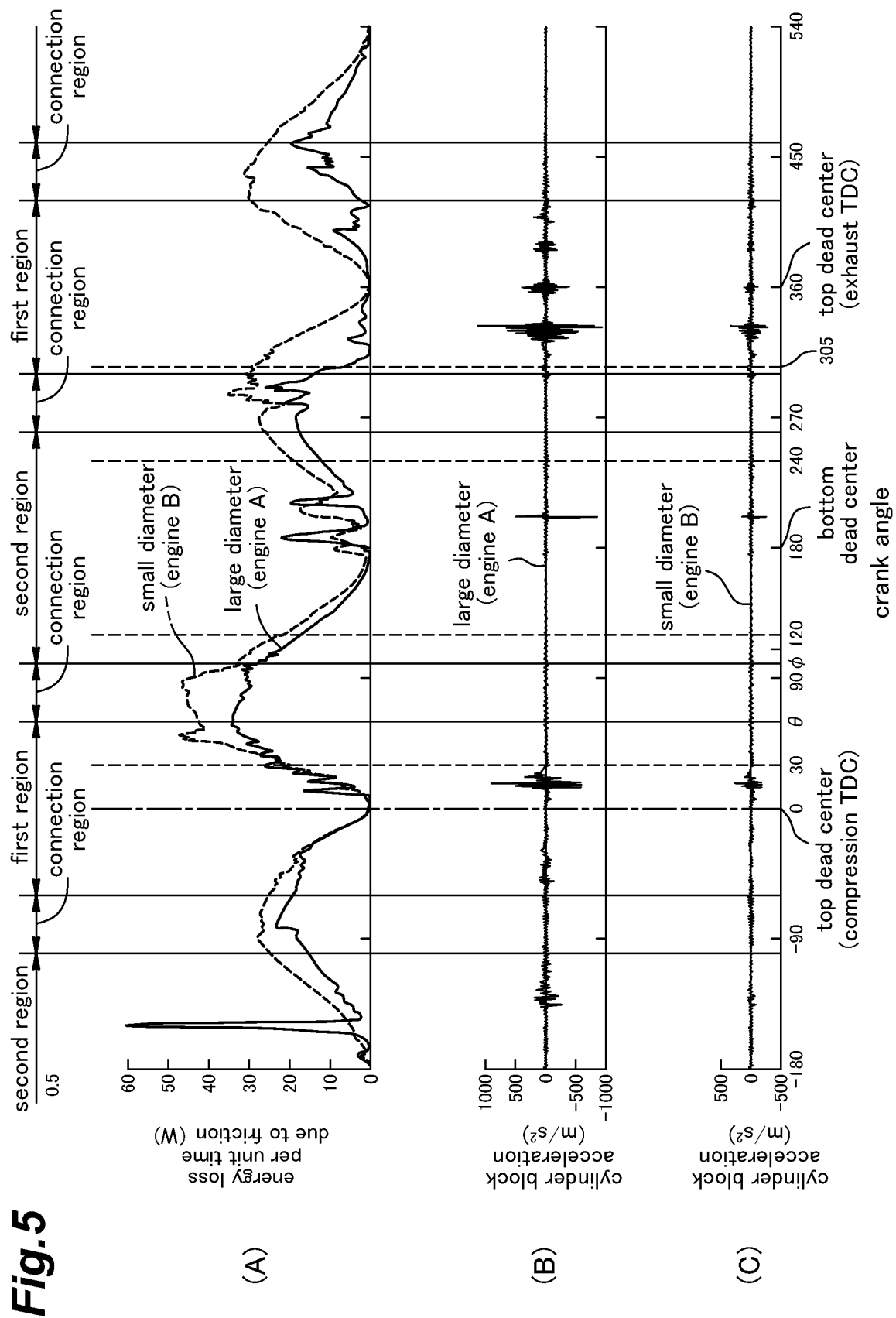
Figure 6A:
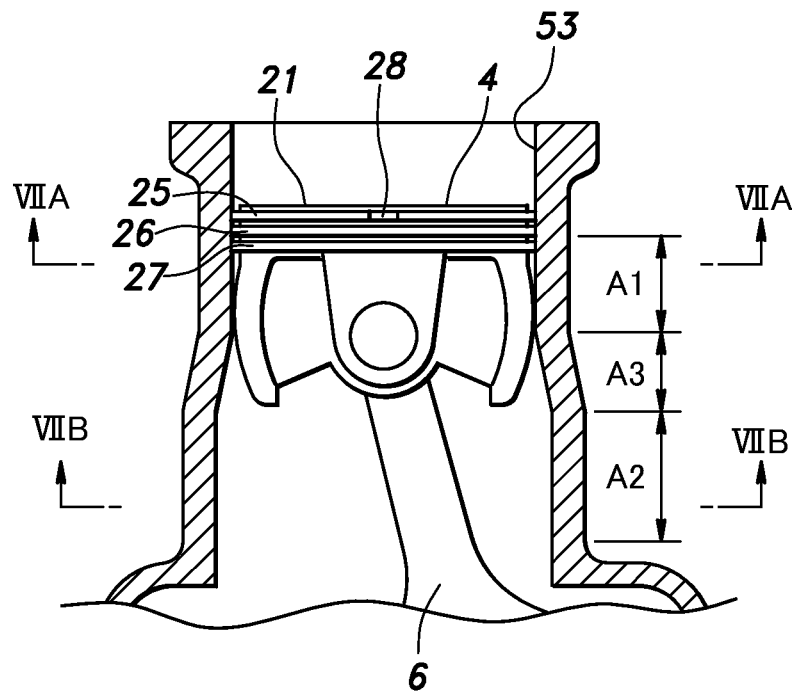
Figure 6B:
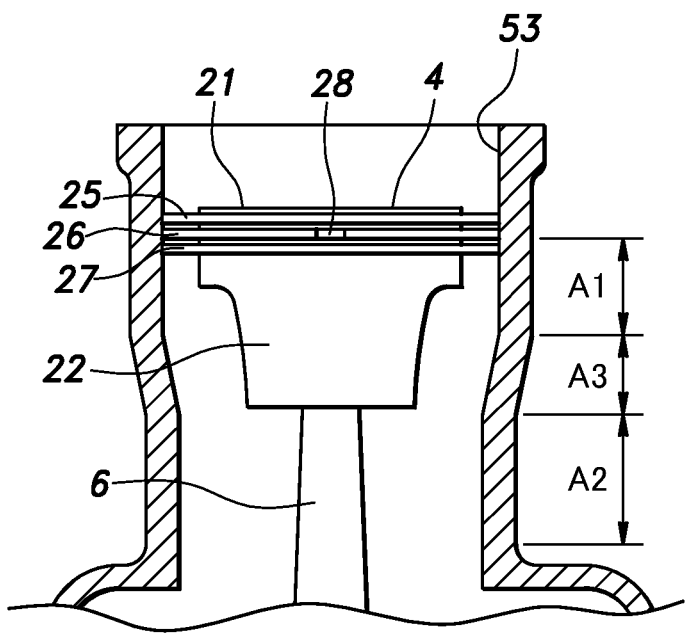
Figure 7A:
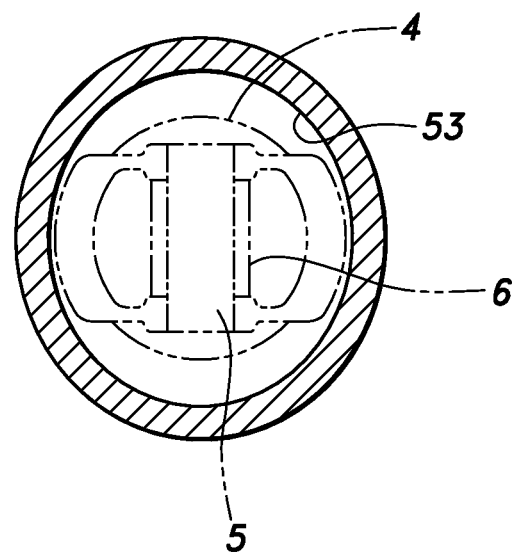
Figure 7B:
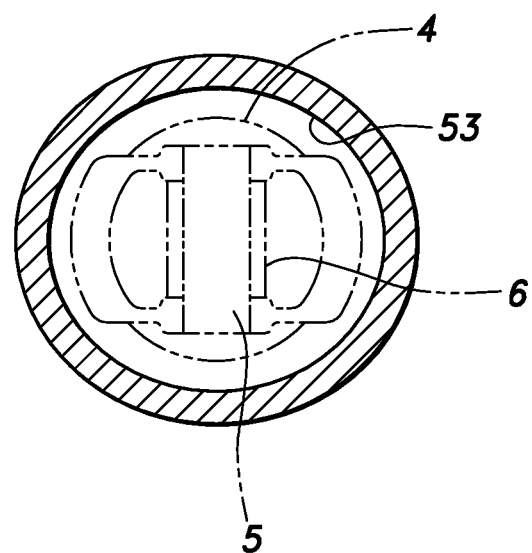
Figure 8:
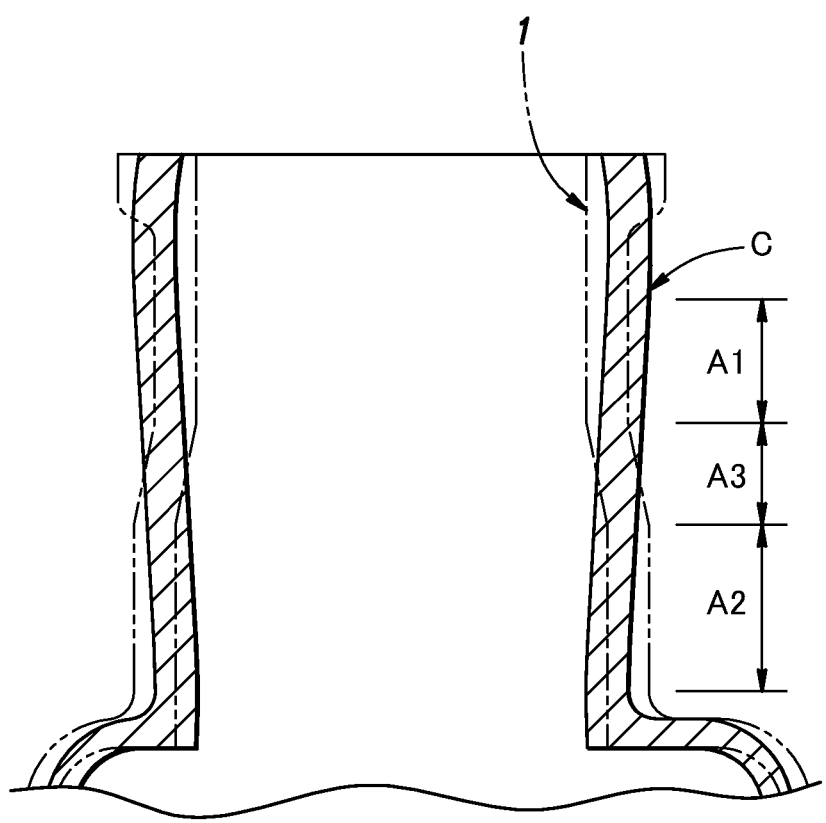
Figure 9:
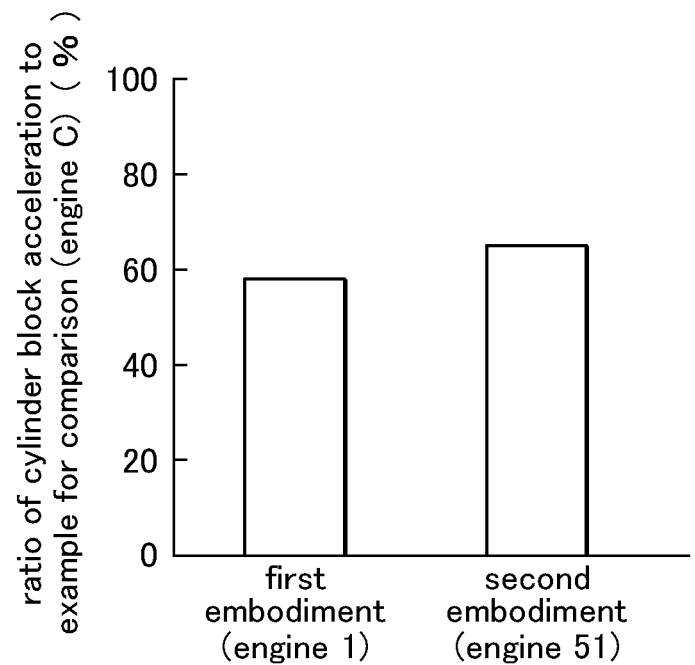
Figure 10:
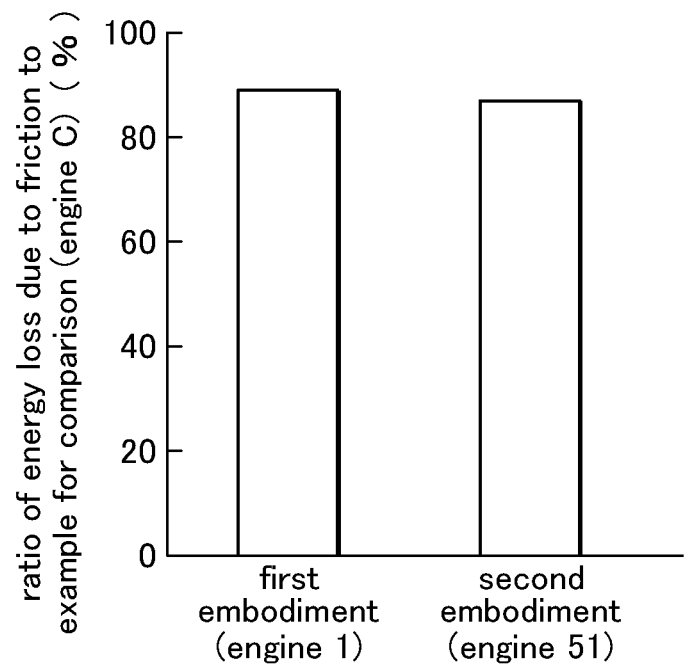

FIG. 5 shows (A) a graph showing the changes in energy loss per unit time during operation due to friction in relation to the crank angle for two engines A and B, (B) a graph showing the changes in the cylinder block (cylinder sleeve) acceleration due to piston slap during operation for engine A, and (C) a graph showing the changes in the cylinder block (cylinder sleeve) acceleration due to piston slap during operation for engine B;

FIG. 6A is a fragmentary vertical sectional view of an internal combustion engine of a second embodiment taken along a plane perpendicular to the crankshaft;

FIG. 6B is a fragmentary vertical sectional view of the internal combustion engine of the second embodiment taken along a plane parallel to the crankshaft;

FIG. 7A is a sectional view of a cylinder block of the internal combustion engine of the second embodiment taken along line VIIA-VIIA of FIG. 6A;

FIG. 7B is a sectional view of the cylinder block of the internal combustion engine of the second embodiment taken along line VIIB-VIIB of FIG. 6A;

FIG. 8 is a fragmentary sectional view showing the configuration of the cylinder bore of an internal combustion engine of an example for comparison during operation in relation to that of the present invention;

FIG. 9 is a graph showing the ratios of the maximum values of the acceleration of the cylinder block (cylinder sleeve) caused by piston slap in the internal combustion engines of the first and second embodiments to that of the internal combustion engine of the example for comparison; and FIG. 10 is a graph showing the ratios of the energy losses in the internal combustion engines of the first and second embodiments due to friction to that of the internal combustion engine of the example for comparison.

MODES FOR CARRYING OUT THE INVENTION

Internal combustions engines according to two different embodiments of the present invention are described in the following with reference to FIGS. 1 to 10.

First Embodiment

Figure 1:
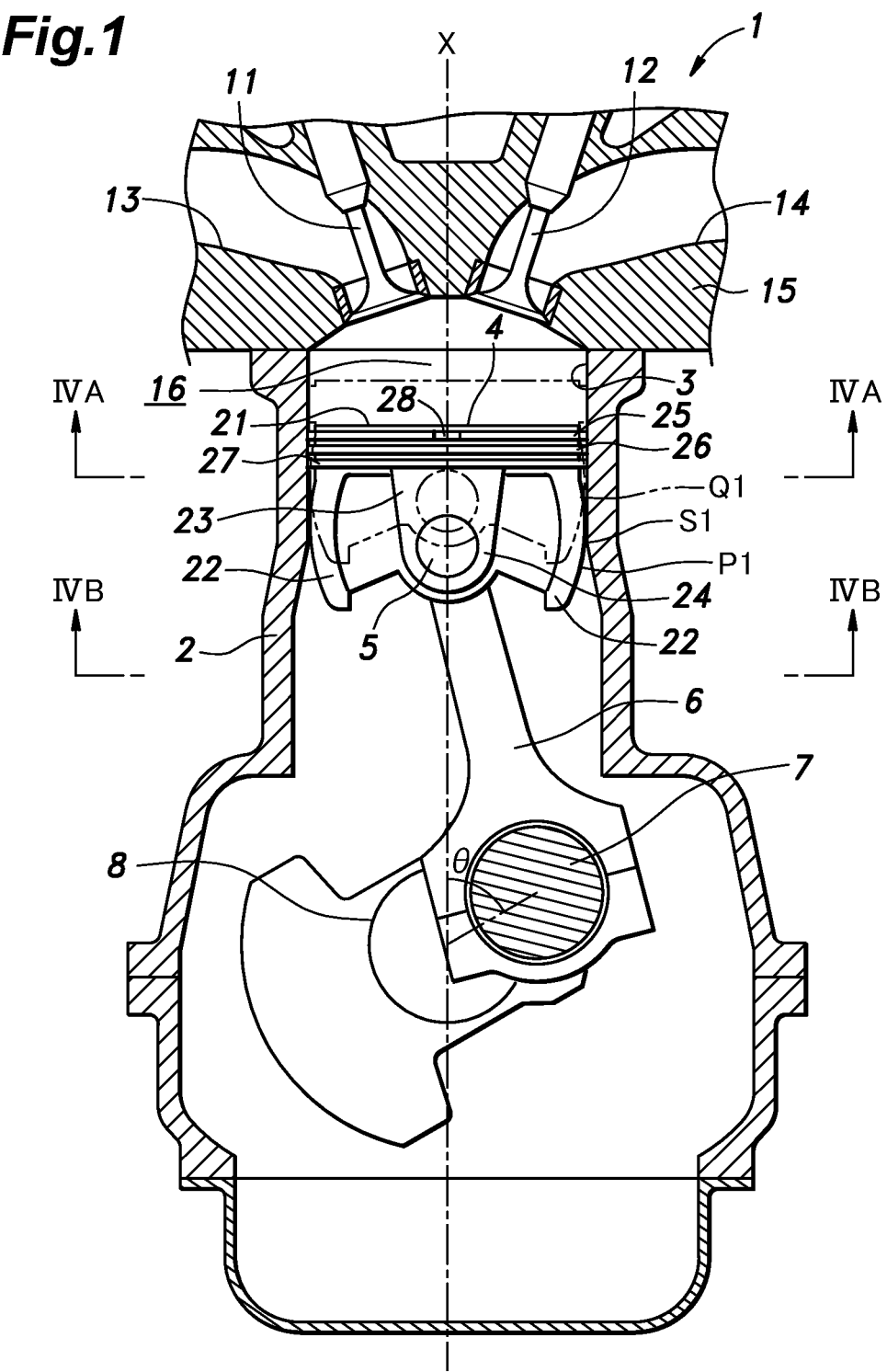
FIG. 1 is a vertical sectional view of an internal combustion engine according to a first embodiment of the present invention taken along a plane perpendicular to a crankshaft.

The internal combustion engine 1 according to the first embodiment is a four-stroke reciprocating engine. As shown in FIG. 1, the internal combustion engine 1 includes a cylinder block 2 (engine main body 2) defining a cylinder bore 3 therein, and a piston 4 is slidably received in the cylinder bore 3. The piston 4 is connected to an upper end of a connecting rod 6 via a piston pin 5, and a lower end of the connecting rod 6 is connected to a crankshaft 8 via a crank pin 7. Although a cylinder sleeve (cylinder liner) is not provided in the present embodiment, the cylinder bore 3 may be also defined by the inner circumferential surface of a cylindrical cylinder sleeve which is press fitted into a sleeve receiving hole of the cylinder block 2. In other words, the engine main body defining the cylinder bore 3 may include a cylinder sleeve.

To the upper side of the cylinder block 2 is connected a cylinder head 15 provided with an intake port 13 and an exhaust port 14 that are configured to be opened and closed by an intake valve 11 and an exhaust valve 12, respectively. A combustion chamber 16 is defined jointly by the lower surface of the cylinder head 15, the upper surface of the piston 4, and the wall surface of the cylinder bore 3.

The piston 4 includes a cylindrical piston head 21, a skirt 22 consisting of a pair of skirt parts depending from the piston head 21, a pair of side walls 23 provided to connect the circumferential end portions of the skirt parts to each other. The side walls 23 are provided with pin boss portions 24, respectively, for supporting the piston pin 5. An outer periphery of the piston head 21 is fitted with a plurality of piston rings 25 to 27. More specifically, the piston rings 25 to 27 are received in corresponding grooves provided on the outer periphery of the piston head 21. The upper two piston rings 25 and 26 consist of compression rings each having an end gap 28, and the lowermost piston ring 27 consists of an oil ring.

Figure 2:
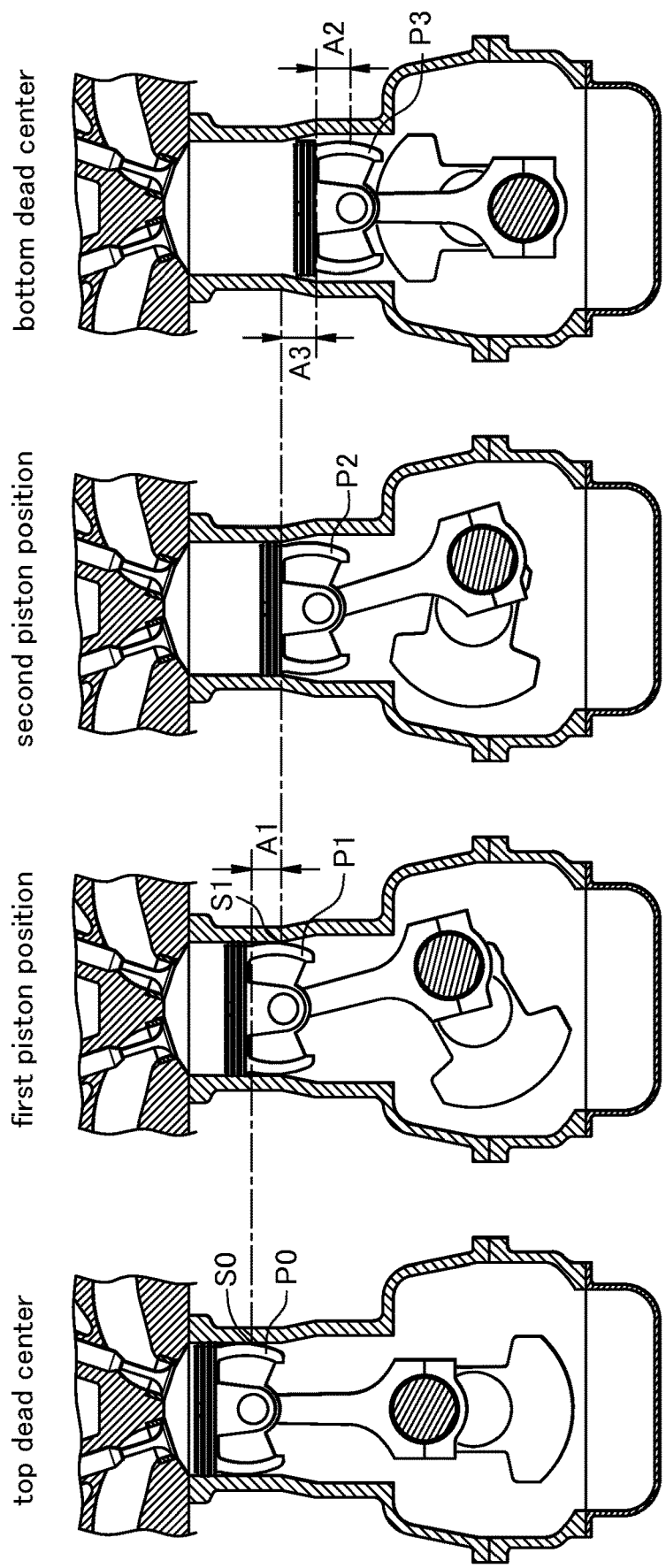
FIGS. 2A to 2D are vertical sectional views of the internal combustion engine of the first embodiment at the top dead center, a first piston position, a second piston position and the bottom dead center, respectively.
Figure 3:
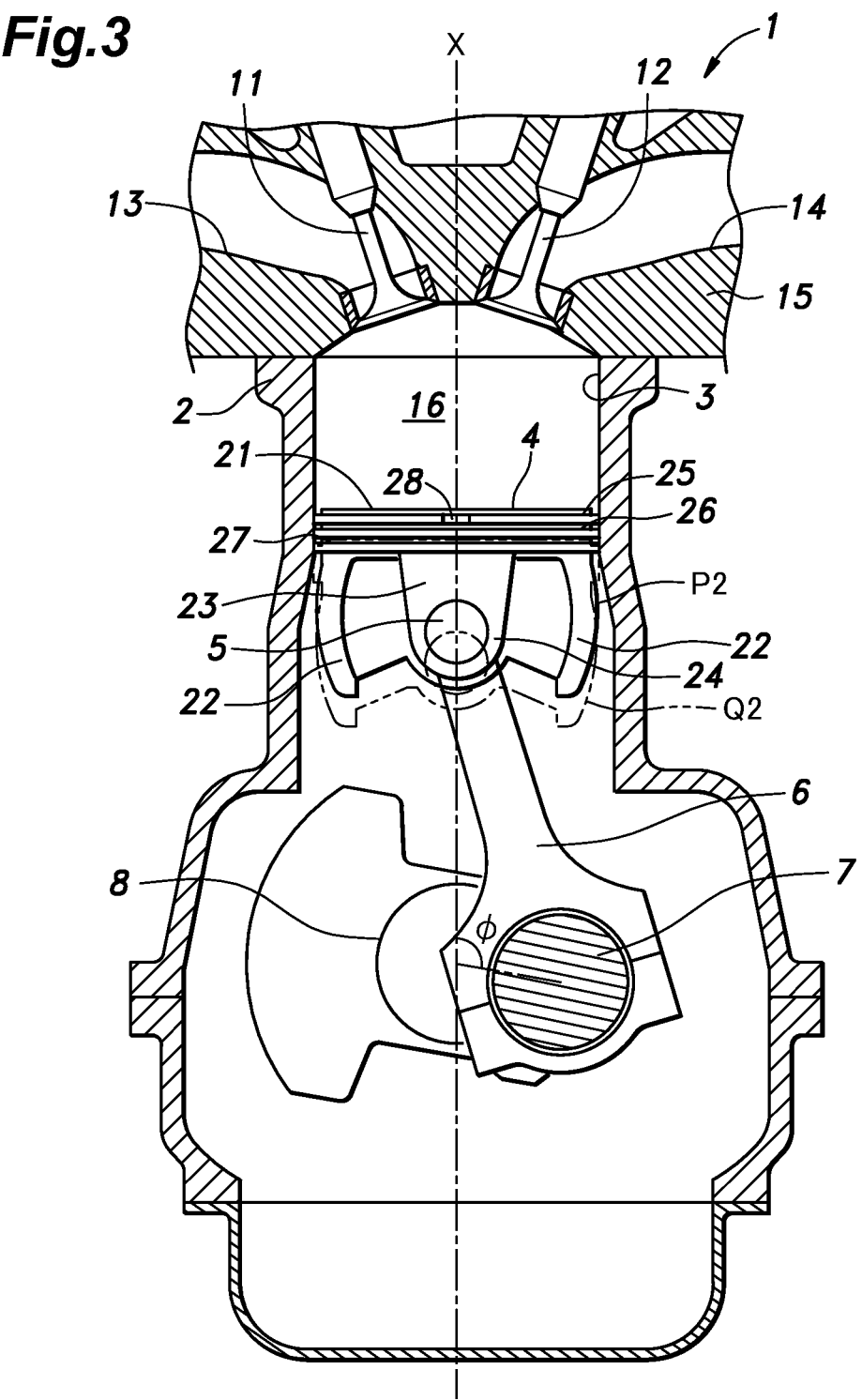
FIG. 3 is a vertical sectional view similar to FIG. 1 when the piston is at a different position from that in FIG. 1.

As shown in FIG. 1, the skirt 22 of the piston 4 bulges in a radial direction of the piston 4 and particularly in the direction perpendicular to the axial line of the crankshaft 8 so as to define a barrel shape. In FIGS. 1, 2 and 3, the bulging of the skirt 22 in the direction perpendicular to the axial line of the crankshaft 8 is exaggerated so that the shape of the skirt 22 of the piston 4 may appear clearly. The fact that the skirt 22 is barrel shaped means that the radial projection of the skirt 22 changes in relation to the axial direction of the cylinder bore 3 (along the cylinder axial line X or the vertical direction in FIG. 1). In particular, the projection of the skirt 22 is smaller in the upper and lower end parts thereof than in the middle part thereof. The most radially projecting part of the skirt 22 will be referred to as "maximum diameter portion" in the following disclosure.

In order to suppress piston slap noise and reduce friction at the same time, the cylinder bore 3 during the operation of the internal combustion engine 1 is given with a particular shape. The shape of the cylinder bore 3 of the first embodiment is described in the following.

Figure 4A:
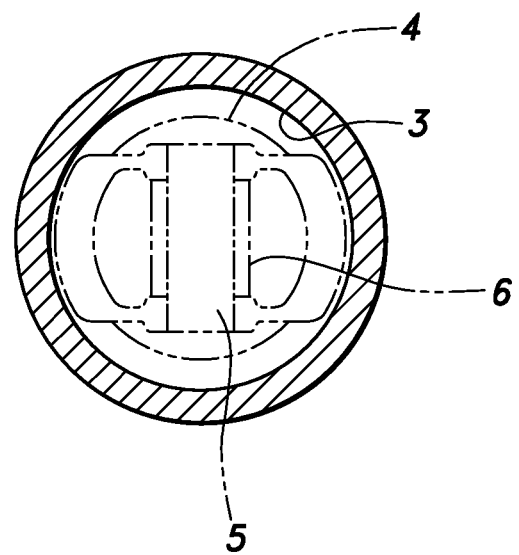
FIG. 4A is a sectional view of a cylinder block of the internal combustion engine of the first embodiment taken along line IVA-IVA of FIG. 1.
Figure 4B:
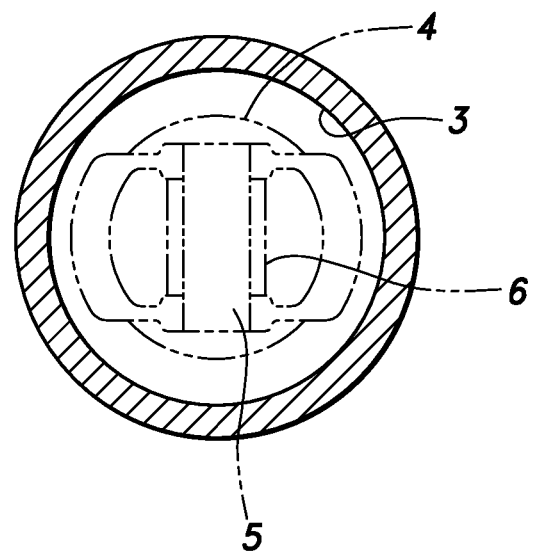
FIG. 4B is a sectional view of the cylinder block of the internal combustion engine of the first embodiment taken along line IVB-IVB of FIG. 1.

FIGS. 4A and 4B are sectional views of the cylinder block 2 taken along line IVA-IVA and line IVB-IVB of FIG. 1, respectively, and a schematic bottom view of the piston 4 is shown in phantom lines in each sectional view to indicate the position of the piston 4. As shown in FIGS. 4A and 4B, the cylinder bore 3 of the first embodiment is formed such that the sectional shape in a plane perpendicular to the cylinder axial line X is circular irrespective of the position in the direction of the cylinder axial line X.

Further, as shown in FIGS. 1 to 3, the upper part of the cylinder bore 3 has a relatively small diameter and the lower part of the cylinder bore 3 has a relatively large diameter. More specifically, the cylinder bore 3 includes a first region A1 defined as a range along the cylinder axial line X in which the maximum diameter portion of the skirt 22 is positioned when the piston 4 is on a side of a top dead center (P0 in FIG. 2A) from a first piston position (P1 in FIG. 1 and FIG. 2B) that is displaced from the top dead center toward a bottom dead center (P3 in FIG. 2D) by a prescribed distance, a second region A2 defined as a range along the cylinder axial line X in which the maximum diameter portion of the skirt is positioned when the piston is on a side of the bottom dead center from a second piston position (P2 in FIG. 2C and FIG. 3) that is closer to the bottom dead center than the first piston position, and a connection region A3 positioned between the first region A1 and the second region A2, and the diameter of the cylinder bore 3 in a direction perpendicular to an axial line of the crankshaft is smaller in the first region than in the second region. In the connection region A3, the diameter of the cylinder bore 3 progressively increases from the side of the top dead center to the side of the bottom dead center or, in other words, as one moves away from the combustion chamber 16, and connects the first region A1 and the second region A2 smoothly. All of the first region A1, the second region A2, and the connection region A3 are coaxially formed with respect to the cylinder axial line X.

Here, the top dead center P0, the first piston position P1, the second piston position P2, and the bottom dead center P3 are defined under the condition that the surface (upper surface) of the piston head 21 of the piston 4 on the side of the combustion chamber 16 is substantially perpendicular to the cylinder axial line X (the piston is not tilted).

The cylinder bore 3 has the above-mentioned shape during the operation of the internal combustion engine 1. During the operation of the internal combustion engine 1, the temperature of the cylinder block 2 (or the cylinder sleeve) defining the cylinder bore 3 gets higher toward the combustion chamber 16, and decreases with an increasing distance from the combustion chamber 16. Since the cylinder head 15 is fastened to the cylinder block 2, the shape of the cylinder bore 3 when the internal combustion engine 1 is in operation is normally different from that when the internal combustion engine 1 is not in operation (at normal temperature).

In the above-described cylinder bore 3, the first piston position P1 that defines the first region A1 may be set such that the angle $\theta$ of the crankshaft 8 when the piston 4 is at the first piston position P1 is 30 to 120 degrees, and more preferably 55 degrees to 113 degrees. Here, the crank angle is measured from the top dead center of the piston 4. In other words, the crank angle is zero when the piston 4 is at the top dead center, and the crank angle increases as the crankshaft rotates during the operation of the internal combustion engine 1. When the piston 4 is at the bottom dead center, the crank angle is 180 degrees, and when the crankshaft 8 has made a full revolution, the crank angle is 360 degrees. In this disclosure, the position of the piston 4 in the direction of the cylinder axial line X is expressed by the crank angle that ranges from zero degrees to 180 degrees. Thus, the crank angle is associated with the position of the piston 4 in the direction of the cylinder axial line X in one to one relationship over this range.

In FIG. 1, the piston 4 at the first piston position P1 is indicated by solid lines, and the piston 4 at the crank angle of 30 degrees is indicated by double-dot chain lines. As shown in FIG. 1, the first piston position P1 is on the side of the bottom dead center side from the position (Q1 in FIG. 1) of the piston 4 when the crank angle is 30 degrees (in other words, 30°<$\theta$). Therefore, when the crank angle is 30 degrees, the maximum diameter portion of the skirt 22 of the piston 4 is located within the first region A1 of the cylinder bore 3 in the direction of the cylinder axial line X.

In FIG. 3, the piston 4 at the second piston position P2 is indicated by solid lines, and the piston 4 when the crank angle is 120 degrees is indicated by double-dot chain lines. Here, the crank angle is $\phi$ when the piston 4 is at the second piston position P2. As shown in FIG. 3, the second piston position P2 is set on the side of the top dead center from the position of the piston 4 (Q2 in FIG. 1) when the crank angle is 120 degrees (in other words, $\phi$<120°). Therefore, when the crank angle is 120 degrees, the maximum diameter portion of the skirt 22 of the piston 4 is located within the second region A2 of the cylinder bore 3 along the cylinder axial line X. The angle $\phi$ is preferably in the range of 62 to 120 degrees. Since the first piston position P1 is located on the side of the upper dead center from the second piston position P2, the angle $\theta$ is smaller than the angle $\phi$.

Preferably, the difference in the diameter of the cylinder bore 3 between the second region A2 and the first region A1 is in a range from 10 µm to 50 µm.

In the this embodiment, the diameter of the cylinder bore 3 is not constant in the direction of the cylinder axial line X as discussed above, but the piston rings (compression rings) 25 and 26 can expanded under the tension thereof so that the piston rings 25 and 26 keep in contact with the wall surface of the cylinder bore 3 without regard to the position of the piston 4 along the cylinder axial line X. In other words, as the piston 4 moves between the top dead center and the bottom dead center, the piston rings 25 and 26 deform so as to conform to the cross sectional shape (diameter) of the cylinder bore 3 in a plane perpendicular to the cylinder axial line X.

Next, a method of forming the cylinder bore 3 having the above configuration will be described in the following. The cylinder block 2 is machined by using an NC boring machine by taking into account thermal expansion and deformation caused by the fastening of the cylinder head 15 so that the cylinder bore 3 has the prescribed shape during the operation of the internal combustion engine 1. After the boring processing, a finishing process consisting of a honing process is performed by using a head provided with a mechanism for causing the abrasive stone to follow the shape of the wall surface of the cylinder bore 3. As a result of these processes, the cylinder bore 3 demonstrating the first region A1, the connection region A3, and the second region A2 during the operation of the internal combustion engine 1 is formed.

The processing of the cylinder bore 3 according to the present embodiment may be performed with the actual cylinder head 15 or a dummy cylinder head fastened to the cylinder block 2. By processing the cylinder bore 3 with the cylinder head 15 or the dummy cylinder head fastened to the cylinder block 2, it can be ensured that the cylinder bore 3 has the prescribed shape when the cylinder head 15 and the cylinder block 2 are fastened together.

The effect of the internal combustion engine 1 configured as described above will be described in the following. (A) in FIG. 5 is a graph showing the energy loss per unit time due to friction during operation in relation to the crank angle in regards to a conventional internal combustion engine A having a relatively large cylinder bore (which is constant in diameter along the cylinder axial line X) and another conventional internal combustion engine B having a relatively small cylinder bore. (B) in FIG. 5 is a graph showing the acceleration of the cylinder block (cylinder sleeve) caused by piston slap during the operation of the internal combustion engine A, and (C) in FIG. 5 is a graph showing the acceleration of the cylinder block (cylinder sleeve) caused by piston slap during the operation of the internal combustion engine B. The internal combustion engines A and B are identical to each other including the shape of the piston other than the diameter of the cylinder bore.

(A) to (C) in FIG. 5 show the inclination angle of the piston 4, the energy loss per unit time due to friction, and the cylinder block acceleration over a range of crank angle from −180 degrees to 540 degrees, the crank angle at the top dead center of the piston at the end of the compression stroke (compression TDC) being defined as zero degrees. The crank angle range of from −180 degrees to 0 degrees corresponds to the compression stroke, the crank angle range of from 0 degrees to 180 degrees corresponds to the expansion stroke, and the crank angle range of from 180 degrees to 360 degrees corresponds to the exhaust stroke, and the crank angle range of from 360 degrees to 540 degrees corresponds to the intake stroke. The top dead center (corresponding to the crank angle of 360 degrees in FIG. 5) upon completion of the exhaust stroke (or upon initiation of the intake stroke) may be referred to as exhaust TDC. As discussed earlier, the crank angle corresponds to the position of the piston 4 in the cylinder bore along the cylinder axial line X.

In (A) of FIG. 5, the energy loss per unit time due to friction in the engine A is indicated by solid lines, and the energy loss per unit time due to friction in the engine B is indicated by broken lines. As can be seen from (A) FIG. 5, the energy loss per unit time due to friction is generally smaller in the engine A than in the engine B over the entire range of crank angle. (B) and (C) in FIG. 5 show the acceleration of the cylinder block (cylinder sleeve) caused by piston slap during the operation of the engines A and B, respectively, in relation to the crankshaft angle. Here, in order to eliminate the influence of the movement of the piston 4 between the top dead center and the bottom dead center, the low frequency component of the acceleration of the cylinder block is removed by using a high pass filter.

As shown in (B) and (C) in FIG. 5, piston slap noise (cylinder block acceleration) is significantly reduced in the engine B in which the diameter of the cylinder bore is relatively small as compared with the engine A in which the diameter of the cylinder bore is relatively large. As shown in (B) in FIG. 5, in the engine A in which the diameter of the cylinder bore is relatively large, a high level of piston slap noise is generated within specific ranges of the crank angle, or more specifically, within certain ranges relatively close to the top dead centers of the piston. In particular, a relatively high level of cylinder block acceleration due to piston slap is detected when the crank angle is zero to 30 degrees or immediately after the compression TDC, when the crank angle is 305 degrees to 340 degrees or immediately before the exhaust TDC, and when the crank angle is about 360 degrees or adjacent to the exhaust TDC. It means that very little piston slap noise is generated even in the case of the engine A in which the diameter of the cylinder bore is relatively large when the crank angle is other than these ranges where a high level of piston slap noise is generated.

Therefore, it can be concluded that piston slap noise and friction can be reduced at the same time if the diameter of the cylinder bore of the engine B is selected over the range extending along the cylinder axial line X where the skirt 22 of the piston 4 is located when the crank angle is in these particular crank angle ranges, and the diameter of the cylinder bore of the engine A is selected over the range extending along the cylinder axial line X where the skirt 22 of the piston 4 is located when the crank angle is outside of these particular crank angle ranges.

In the internal combustion engine 1 of the present embodiment, the diameter of the cylinder bore 3 in the first region A1 corresponds to the diameter of the cylinder bore of the engine B, and the diameter of the cylinder bore 3 in the second region A2 corresponds to the diameter of the cylinder bore of the engine A. More specifically, in the internal combustion engine 1 of the present embodiment, the crank angle θ corresponding to the first piston position P1 that defines the first region A1 is located on the side of the bottom dead center from the crank angle range where piston slap noise tends to occur, so that the first region A1 where the diameter of the cylinder bore 3 is relatively small includes the range along the cylinder axial line X where the maximum diameter portion of the skirt 22 of the piston 4 is located when the crank angle is in the crank angle range where piston slap noise tends to occur. As a result, the diameter of the cylinder bore 3 is relatively small (or the clearance between the wall surface of the cylinder bore 3 and the skirt 22 is relatively small) in this range along the cylinder axial line X, whereby piston slap noise can be suppressed.

The crank angle ϕ corresponding to the second piston position P2 that defines the second region A2 of the cylinder bore 3 is located on the side of the bottom dead center from the crank angle θ and adjacent to the crank angle θ. As a result, the second region A2 where the diameter of the cylinder bore 3 is relatively large includes a large part of the range along the cylinder axial line X where the maximum diameter portion of the skirt 22 of the piston 4 is located when the crank angle is in the crank angle range other than the crank angle ranges where piston slap noise tends to occur. Thus, the diameter of the cylinder bore 3 is made relatively large (or the clearance between the wall surface of the cylinder bore 3 and the skirt 22 is made relatively large) over the large part of the range extending along the cylinder axial line so that the friction between the piston 4 and the wall surface of the cylinder bore 3 can be reduced without increasing piston slap noise. Thus, according to the internal combustion engine 1 of this embodiment, piston slap noise and friction can be reduced in a favorable manner.

The first piston position P1 (or the crank angle θ corresponding to the first piston position P1) defining the first region A1 is not required to be set such that the range along the cylinder axial line X where the maximum diameter portion of the skirt 22 of the piston 4 is located when the crank angle is in the crank angle range where piston slap noise tends to occur is entirely included in the first region A1, but may be set such that at least a part of the range along the cylinder axial line X is included. However, it is preferred that the first piston position P1 is on the side of the bottom dead center from the position along the cylinder axial line X corresponding to the crank angle of 30 degrees in order to reduce piston slap noise in an early part of the expansion stroke immediately after the compression TDC as well as piston slap noise in a timing adjacent to the exhaust TDC. It is also preferred that the first piston position P1 is at a position along the cylinder axial line X corresponding to the crank angle of 55 degrees or more toward the bottom dead center in order to reduce piston slap noise in the crank angle range of from 305 degrees to 340 degrees. In order to reduce the lighter piston slap noise, the first piston position P1 may be positioned at a point along the cylinder axial line X corresponding to the crank angle of 120 degrees. If the first piston position P1 is located more toward the bottom dead center, the second region A2 where the diameter of the cylinder bore 3 is relatively large is somewhat reduced in size so that friction may not be reduced so much as desired.

To achieve an adequate reduction in friction, the second piston position P2 defining the second region A2 is preferred to be at the position along the cylinder axial line X corresponding to the crank angle of 120 degrees or more toward the top dead center.

In this embodiment, since the cross sectional shape of the cylinder bore 3 in the first region A1 in the plane perpendicular to the cylinder axial line X is substantially uniform, and the cross sectional shape of the cylinder bore 3 in the second region A2 in the plane perpendicular to the cylinder axial line X is substantially uniform, the structure of the cylinder bore 3 is simplified so that the forming of the cylinder bore 3 is facilitated.

In this embodiment, since the cross sectional shape of the cylinder bore 3 in the plane perpendicular to the cylinder axial line X is circular in all of the first region A1, the connection region A3 and the second region A2, the cylinder bore can be formed with ease. In particular, the cylinder bore can be favorably finished by honing without any difficulty.

Second Embodiment

An internal combustion engine according to a second embodiment of the present invention will be described in the following with reference to FIGS. 6 and 7.

In the first embodiment described above, the cross sectional shape of the cylinder bore 3 in the plane perpendicular to the cylinder axial line X was circular in all of the first region A1, the connection region A3 and the second region A2. However, since the magnitude of the piston slap noise and friction depends on the diameter of the cylinder bore 3 in the direction perpendicular to the axial line of the crankshaft 8, the diameter of the cylinder bore 3 in the direction perpendicular to the axial line of the crankshaft 8 may be reduced in the first region in order to suppress piston slap and may be increased in the second region A2 to reduce friction, instead of simply making the cross sectional shape of the cylinder bore 3 in the plane perpendicular to the cylinder axial line X to be circular in both the first region A1 and the second region A2.

FIGS. 7A and 7B are a sectional view of the cylinder block 2 taken along line VIIA-VIIA of FIG. 6A, and a sectional view of the cylinder block 2 taken along line VIIB-VIIB of FIG. 6B, respectively. In each sectional view, a schematic bottom view of the piston 4 is indicated by phantom lines. As shown in FIGS. 6A and 6B, the cylinder bore 53 provided in the internal combustion engine 51 according to the second embodiment is also provided with a first region A1, a connection region A3, and a second region A2, in this order, from the side of the combustion chamber 16, and the diameter of the cylinder bore 3 in the direction perpendicular to the axial line of the crankshaft 8 is smaller in the first region A1 than in the second region A2, in a similar manner as the cylinder bore 3 of the first embodiment. Furthermore, the cross sectional shape in the plane perpendicular to the cylinder axial line X of the cylinder bore 53 is substantially constant in each of the first region A1 and the second region A2.

However, as shown in FIGS. 7A and 7B, in the cylinder bore 53 of the second embodiment, in each of the first region A1 and the second region A2, the cross sectional shape in the plane perpendicular to the cylinder axial line X is elliptic instead of being circular. More specifically, as shown in FIG. 7A, in the first region A1, the shape of the cross section of the cylinder bore 53 in the plane perpendicular to the cylinder axial line X is ellipse which is elongated in the axial direction of the crankshaft 8 (in other words, an ellipse having a major axis extending in the axial direction of the crankshaft 8 and the minor axis extending perpendicular to the axial line of the crankshaft 8). As shown in FIG. 7B, in the second region A2, the shape of the cross section of the cylinder bore 53 in the plane perpendicular to the cylinder axial line X is ellipse which is elongated in the direction perpendicular to the axial direction of the crankshaft 8 (in other words, an ellipse having a major axis extending in a direction perpendicular to the axial line of the crankshaft 8 and the minor axis extending in the axial direction of the crankshaft 8).

Furthermore, in this embodiment, the elliptic cross sectional shape of the cylinder bore 53 in the first region A1 is identical to the cross sectional shape of the cylinder bore 53 in the second region A2 in having the major axis of the same length and the minor axis of the same length although the directions of the major axis and the minor axis differ between the first region A1 and the second region A2. In other words, the elliptic cross sectional shape of the cylinder bore 53 in the second region A2 can be obtained by rotating the elliptic cross sectional shape of the cylinder bore 53 in the first region A1 by 90 degrees. Therefore, in this embodiment, the circumferential length of the cross section in the plane perpendicular to the cylinder axial line X is the same in the first region A1 and the second region A2. Since the diameter of the cylinder bore 53 in the first region A1 as measured in the direction perpendicular to the axial line of the crankshaft 8 coincides with the length of the minor axis of the elliptic cross section, and the diameter of the cylinder bore 53 in the second region A2 as measured in the direction perpendicular to the axial line of the crankshaft 8 coincides with the length of the major axis of the elliptic cross section, the diameter of the cylinder bore 53 in the second region A2 as measured in the direction perpendicular to the axial line of the crankshaft 8 is larger than the diameter of the cylinder bore 3 in the first region A1 as measured in the direction perpendicular to the axial line of the crankshaft 8.

In the connection region A3 smoothly connecting the first region A1 and the second region A2 to each other, the circumferential length of the cross section in the plane perpendicular to the cylinder axial line X is substantially the same as those of the first region A1 and the second region A2, and is constant along the cylinder axial line X.

In the second embodiment also, the diameter of the cylinder bore 53 in the direction perpendicular to the axial line of the crankshaft 8 is relatively small in the first region A1 so that piston slap noise can be effectively suppressed. In the second embodiment also, the diameter of the cylinder bore 53 in the direction perpendicular to the axial line of the crankshaft 8 is relatively large in the second region A2 so that friction can be reduced without increasing piston slap noise. Therefore, the second embodiment allows piston slap noise to be suppressed and friction to be reduced in a favorable manner, similarly as the first embodiment.

Further, in the first embodiment, since the cross sectional shape of the cylinder bore 3 is circular in the first region A1 and the second region A2, the circumferential length of the cross section of the cylinder bore 3 in the second region A2 is larger than the circumferential length of the cylinder bore 3 in the first region A1. Therefore, as the piston 4 moves from the first region A1 to the second region A2, the piston rings 25 and 26 expand in diameter, and the end gaps 28 of the piston rings 25 and 26 widen. It is therefore possible that the amount of blowby gas that passes through the end gaps 28 increases due to the widening of the end gaps 28.

On the other hand, in the case of the cylinder bore 53 of the second embodiment, the circumferential length of the cross section of the cylinder bore 53 in the first region A1 is equal to the circumferential length of the cross section of the cylinder bore 53 in the second region A2. Therefore, as the piston 4 moves from the first region A1 to the second region A2, the end gaps 28 of the piston rings 25 and 26 do not widen so that an increase in the generation of blowby gas can be avoided in the second embodiment in comparison with the first embodiment.

Samples of the Embodiments

In order to evaluate the effect of the present invention, the engine 1 of the first embodiment, the engine 51 of the second embodiment, and the engine C of a comparative example were prototyped and tested. The crank angle of the engine 1 when the piston 4 is at the first piston position P1 is the same as the crank angle of the engine 51 when the piston 4 is at the first piston position P1. Likewise, the crank angle of the engine 1 when the piston 4 is at the second piston position P2 is the same as the crank angle of the engine 51 when the piston 4 is at the second piston position P2. In the engine 1, the crank angle when the piston is at the first piston position P1 is larger than 50 degrees, and the crank angle when the piston 4 is at the second piston position P2 is larger than 67 degrees.

Also, the diameter of the cylinder bore 3 of the engine 1 in the first region is the same as the diameter of the cylinder bore 53 of the engine 1 in the first region in the direction perpendicular to the axial line of the crankshaft, and the diameter of the cylinder bore 3 of the engine 1 in the second region is the same as the diameter of the cylinder bore 53 of the engine 1 in the second region in the direction perpendicular to the axial line of the crankshaft. The cylinder bore of the engine C has a circular cross section in the plane perpendicular to the cylinder axial line X, and has a diameter that varies along the cylinder axial line X. In FIG. 7, the section of the cylinder bore of the engine 1 taken along a plane containing the cylinder axial line X is indicated by solid lines, and the section of the cylinder bore of the engine C taken along a plane containing the cylinder axial line X is indicated by double-dot chain lines. In the range defined along the cylinder axial line X so as to correspond to the first region A1 of the cylinder bore 3 of the engine 1, the diameter of the cylinder bore of the engine C is larger than the diameter of the cylinder bore of the engine 1. Likewise, in the range defined along the cylinder axial line X so as to correspond to the second region A2 of the cylinder bore 3 of the engine 1, the diameter of the cylinder bore of the engine C is smaller than the diameter of the cylinder bore of the engine 1.

As shown in FIGS. 9 and 10, the engine 1 and the engine 51 are both determined to be improved over the engine C in terms of piston slap noise (cylinder block acceleration due to piston slap) and energy loss due to friction. In other words, in both the engines 1 and 51, piston slap noise is suppressed and friction is reduced at the same time.

Although the present invention has been described in terms of specific embodiments, the present invention is not limited by such embodiments, but can be freely modified without departing from the spirit of the present invention. The wall surface of the cylinder bore 3 and 53 may be finished in two stages (plateau honing) so as to form elevated plateau surfaces and valleys extending between the plateau surfaces. In such a case, the diameter of the cylinder bore 3 and 53 may be measured with respect to points on the plateau surfaces.

GLOSSARY OF TERMS

| | | | |
|---|---|---|---|
| 1: | internal combustion engine | 2: | engine main body (cylinder block) |
| 3: | cylinder bore of a first embodiment | | |
| 4: | piston | 6: | connecting rod |
| 8: | crankshaft | 21: | piston head |
| 22: | skirt | 25, 26: | piston ring |
| 28: | end gap | | |
| 53: | cylinder bore of a second embodiment | | |
| A1: | first region | A2: | second region |
| A3: | connection region | X: | cylinder axial line |

The invention claimed is:

1. An internal combustion engine, comprising:
an engine main body defining a cylinder bore;
a piston received in the cylinder bore to reciprocate along a cylinder axial line; and
a crankshaft rotatably supported by the engine main body and connected with the piston via a connecting rod,
wherein the piston includes a skirt consisting of a pair of skirt parts,
wherein the cylinder bore includes:
a first region defined as a range along the cylinder axial line in which a maximum diameter portion of the skirt is positioned when the piston is on a side of a top dead center from a first piston position that is displaced from the top dead center toward a bottom dead center by a prescribed distance;
a second region defined as a range along the cylinder axial line in which the maximum diameter portion of the skirt is positioned when the piston is on a side of the bottom dead center from a second piston position that is closer to the bottom dead center than the first piston position; and
a connection region positioned between the first and second regions,
and wherein a diameter of the cylinder bore in a direction perpendicular to an axial line of the crankshaft is smaller in the first region than in the second region, and the connection region connects the first region and the second region smoothly,
wherein a cross sectional shape of the cylinder bore in a plane perpendicular to the cylinder axial line is an ellipse in the first region, the ellipse having a minor axis extending in a direction perpendicular to the axial line of the crankshaft and a major axis extending along the axial line of the crankshaft, and
wherein a cross sectional shape of the cylinder bore in the plane perpendicular to the cylinder axial line is an ellipse in the second region, the ellipse having a major axis extending in a direction perpendicular to the axial line of the crankshaft and a minor axis extending along the axial line of the crankshaft,
the cylinder bore having a substantially same circumferential length in all of the first region, the second region, and the connection region.

2. The internal combustion engine according to claim 1, wherein the first piston position is set to be closer to the bottom dead center than a position of the piston corresponding to a crank angle of thirty degrees from the top dead center.

3. The internal combustion engine according to claim 1, wherein the second piston position is set to be closer to the bottom dead center than a position of the piston corresponding to a crank angle of fifty five degrees from the top dead center.

4. The internal combustion engine according to claim 1, wherein the first piston position is set to be closer to the top dead center than a position of the piston corresponding to a crank angle of 120 degrees from the top dead center.

5. The internal combustion engine according to claim 1, wherein
   a cross sectional shape of the cylinder bore in a plane perpendicular to the cylinder axial line is substantially uniform in the first region defined along the cylinder axial line, and
   a cross sectional shape of the cylinder bore in the plane perpendicular to the cylinder axial line is substantially uniform in the second region defined along the cylinder axial line.

6. The internal combustion engine according to claim 1, wherein a cross sectional shape of the cylinder bore in a plane perpendicular to the cylinder axial line is circular in all of the first region, the connection region and the second region.

\* \* \* \* \*